United States Patent
Kubota (10) Patent No.: US 12,394,109 B2
(45) Date of Patent: Aug. 19, 2025

(54) VECTORIZATION OF IMAGES GENERATED BY ARTIFICIAL INTELLIGENCE

(71) Applicant: Nozomu Kubota, Tokyo (JP)

(72) Inventor: Nozomu Kubota, Tokyo (JP)

( * ) Notice: Subject to any disclaimer, the term of this patent is extended or adjusted under 35 U.S.C. 154(b) by 264 days.

(21) Appl. No.: 18/115,361

(22) Filed: Feb. 28, 2023

(65) Prior Publication Data

US 2023/0274469 A1    Aug. 31, 2023

(30) Foreign Application Priority Data

Feb. 28, 2022    (JP) .................. 2022-029232

(51) Int. Cl.
*G06T 11/00* (2006.01)
*G06N 3/0475* (2023.01)
*G06N 3/0985* (2023.01)

(52) U.S. Cl.
CPC ............ *G06T 11/00* (2013.01); *G06N 3/0475* (2023.01); *G06N 3/0985* (2023.01); *G06T 2210/32* (2013.01)

(58) Field of Classification Search
CPC .... G06N 3/0985; G06N 3/0475; G06N 3/094; G06N 3/084; G06N 3/045; G06N 3/08; G06T 11/00; G06T 2210/32; G06T 11/60; G06T 11/203; G06T 11/001; G06F 16/29; G06F 3/1205; H04N 2201/0094; H04N 1/32144; H04N 1/00005
See application file for complete search history.

(56) References Cited

U.S. PATENT DOCUMENTS

| | | | |
|---|---|---|---|
| 2019/0221294 A1* | 7/2019 | Jung | G16H 50/50 |
| 2019/0295302 A1* | 9/2019 | Fu | G06T 11/00 |
| 2020/0151561 A1* | 5/2020 | Kaneko | G06N 3/08 |
| 2021/0064858 A1* | 3/2021 | Batra | G06N 3/08 |
| 2021/0065417 A1* | 3/2021 | Hartfiel | G06N 3/045 |

FOREIGN PATENT DOCUMENTS

JP    2022-003423 A    1/2022

* cited by examiner

*Primary Examiner* — Xilin Guo (74) *Attorney, Agent, or Firm* — PROCOPIO, CORY, HARGREAVES & SAVITCH LLP (57) ABSTRACT

In an information processing method executed by an information processing device having a processor, the processor executes generating a first image in raster format using a generative adversarial network that includes a generator and a discriminator, converting the first image into a second image in vector format, inputting a third image obtained by converting the second image into raster format, or the second image, to the discriminator, and acquiring discrimination results, and storing the second image in a storage unit, if the discrimination results are true, or if the discrimination results are the same as discrimination results by the discriminator regarding the first image.

8 Claims, 8 Drawing Sheets

| IMAGE ID | IMAGE |
|---|---|
| 0001 | Img01 |
| 0002 | Img02 |
| ... | ... |

Fig. 5

| IMAGE CONVERSION | NOISE |
|---|---|
| PNG→SVG | N01 |
| JPEG→SVG | N02 |
| ... | ... |

VECTORIZATION OF IMAGES GENERATED BY ARTIFICIAL INTELLIGENCE

BACKGROUND

Field

The present invention relates to an information processing method, an information processing device, and a program, for converting an image generated by artificial intelligence into a vector image.

Description of Related Art

Generating high-quality images using generative adversarial networks (GANs) is conventionally known (e.g., Patent Publication JP-A-2022-3423).

SUMMARY

In a case of generating an image using artificial intelligence (AI), the image is often generated using generative adversarial networks (GANs). Images generated by GANs are high in quality, but mostly are images in raster format, and accordingly are not suitable for changing image size. For example, even with high-resolution raster images, blurring inevitably occurs at portions such as curves when greatly enlarged, and the image quality deteriorates.

Accordingly, it is an object of the present invention to provide an information processing method, an information processing device, and a program, which are capable of changing size while preventing deterioration of image quality, even with images generated by artificial intelligence (AI) or the like.

An information processing method according to an aspect of the present invention is an information processing method executed by an information processing device having a processor. The processor executes: generating a first image in raster format using a generative adversarial network that includes a generator and a discriminator; converting the first image into a second image in vector format; inputting a third image obtained by converting the second image into raster format, or the second image, to the discriminator, and acquiring discrimination results; and storing the second image in a storage unit, if the discrimination results are true, or if the discrimination results are the same as discrimination results by the discriminator regarding the first image.

According to the present invention, image size can be changed while preventing deterioration of image quality, even with images generated by artificial intelligence (AI) or the like.

DETAILED DESCRIPTION

An embodiment of the present invention will be described with reference to the attached Figures. Note that in the Figures, items denoted by the same signs have the same or equivalent configurations.

System Configuration

Figure 1:
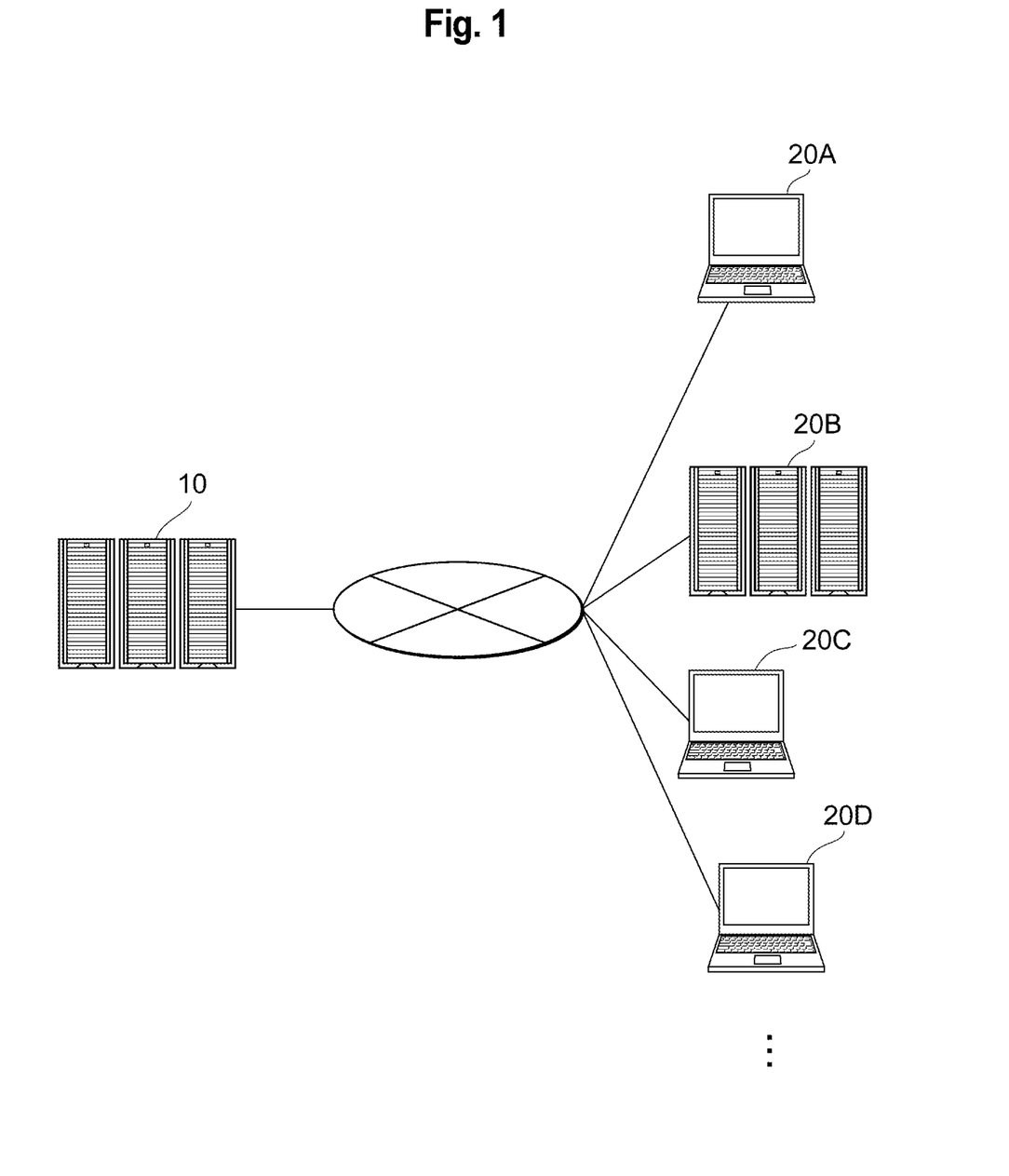
FIG. 1 is a diagram illustrating an example of a system configuration according to an embodiment.

FIG. 1 is a diagram illustrating an example of a system configuration according to the embodiment. In the example illustrated in FIG. 1, a server 10, and various information processing devices 20A, 20B, 20C, and 20D are connected via a network, so as to be capable of exchanging data. In cases in which the information processing devices are not individually differentiated, these may be referred to collectively as "information processing devices 20".

The server 10 is an information processing device (an information processing apparatus) that is capable of collecting and analyzing data, and may be made up of one or a plurality of information processing devices. The information processing devices 20 are information processing devices (information processing apparatus) that are capable of executing machine learning, such as smartphones, personal computers, tablet terminals, servers, connected cars, and so forth. Note that the information processing devices 20 may be devices that are directly or indirectly connected to invasive or noninvasive electrodes that perform sensing of brainwaves, and that are capable of analyzing and exchanging brainwave data.

In the system illustrated in FIG. 1, the server 10 generates images by GANs, for example, converts the images that are generated into vector format, and stores images in vector format. At this time, instead of simply converting the images in raster format, generated by the GANs, into vector format, conversion error at the time of converting images in raster format into images in vector format is taken into consideration. That is to say, an image in vector format is saved such that when displaying the image in vector format on a display or the like, the displayed image will be approximately the same as the original image raster format, taking into consideration the conversion error in conversion from raster format to vector format.

The server 10 may generate predetermined images using GANs, in response to requests from the information processing devices 20 for predetermined images, generate the predetermined images in vector format described above, on the basis of the predetermined images that are generated, transmit these predetermined images in vector format to the information processing devices 20 that made the requests, and so forth.

The information processing devices 20 transmit requests for generating predetermined images to the server 10, with conditions and so forth specified. Also, the information processing devices 20 may receive the predetermined images in vector format from the server 10, and display the predetermined images in virtual space.

Accordingly, the predetermined images in raster format that are generated by AI are converted into vector format that can be deemed to be the same as raster images, by taking conversion error into consideration, and thus deterioration of image quality can be suppressed even if the predetermined images are subjected to change in size. For example, in a case in which images generated by AI are sold in virtual space (e.g., in a metaverse), images can be sold that do not exhibit image quality deterioration even when the size thereof is changed.

Hardware Configuration

Figure 2:
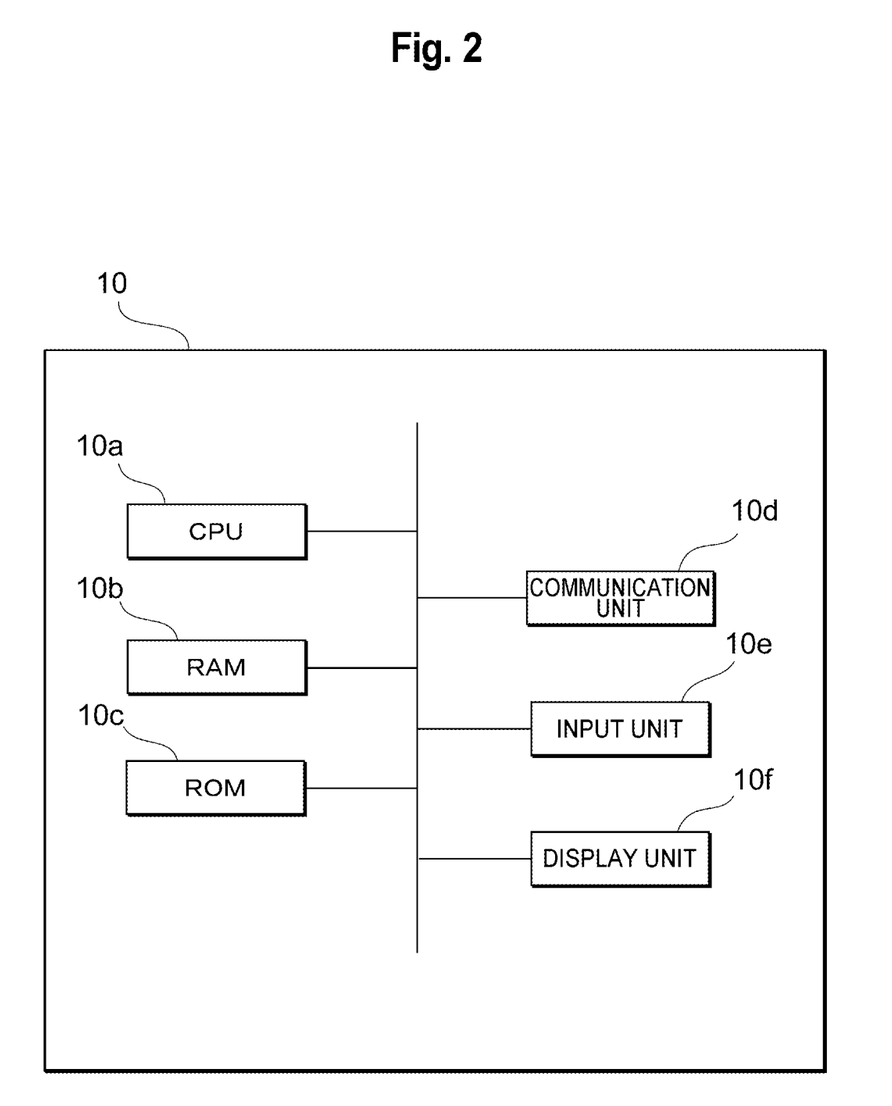
FIG. 2 is a diagram illustrating an example of a physical configuration of an information processing device according to the embodiment.

FIG. 2 is a diagram illustrating an example of a physical configuration of the information processing device 10 according to the embodiment. The information processing device 10 includes a central processing unit (CPU) 10a that corresponds to a computing unit, random-access memory (RAM) 10b that corresponds to a storage unit, read-only memory (ROM) 10c that corresponds to a storage unit, a communication unit 10d, an input unit 10e, and a display unit 10f. These configurations are connected so as to be capable of exchanging data with each other via a bus.

Although a case in which one computer makes up the information processing device 10 will be described in the present embodiment, a plurality of computers or a plurality of computing units may be combined to realize the information processing device 10. Also, the configuration illustrated in FIG. 2 is an example, and the information processing device 10 may have configurations other than these or may not have some of these configurations.

The CPU 10a is an example of a processor, and is a control unit that performs control relating to execution of programs stored in the RAM 10b or the ROM 10c, and computing and processing of data. The CPU 10a is a computing unit that executes a program (learning program) that performs learning using a predetermined learning model, for example. The CPU 10a receives various types of data from the input unit 10e and the communication unit 10d, and displays computation results of data on the display unit 10f, and performs storage thereof in the RAM 10b.

The RAM 10b is one of storage units of which data is rewritable, and may be made up of a semiconductor storage device, for example. The RAM 10b may store programs executed by the CPU 10a, learning models, data relating to parameters for the learning models, data used for learning, and so forth. Note that these are exemplary, and the RAM 10b may store data other than these or may not store some of these.

The ROM 10c is one of storage units from which data is readable, and may be made up of a semiconductor storage device, for example. The ROM 10c may store, for example, learning programs, and data that is not to be rewritten.

The communication unit 10d is an interface for connecting the information processing device 10 to other equipment. The communication unit 10d may be connected to a communication network such as the Internet or the like.

The input unit 10e is for accepting input of data from a user, and may include a keyboard and a touch panel, for example.

The display unit 10f is for visually displaying results of computation performed by the CPU 10a, and may be made up of a liquid crystal display (LCD), for example. Displaying the results of computation on the display unit 10f can contribute to Explainable AI (XAI). The display unit 10f may display, for example, learning results and data relating to learning.

The learning programs may be stored in computer-readable non-transitory recording medium such as the RAM 10b, the ROM 10c, or the like, and thus be provided, or may be provided via a communication network to which the communication unit 10d is connected. The information processing device 10 realizes various types of operations, which will be described later, by one or a plurality of the CPU 10a executing programs. It should be noted that these physical configurations are exemplary, and do not necessarily have to be independent configurations. For example, the information processing device 10 may include a large-scale integration (LSI) integrated circuit, in which the CPU 10a, the RAM 10b, and the ROM 10c are integrated. The information processing device 10 may also include a graphical processing unit (GPU) or an application specific integrated circuit (ASIC).

Note that the configurations of the information processing devices 20 are the same as the configuration of the information processing device 10 illustrated in FIG. 2, and accordingly description thereof will be omitted. Also, it is sufficient for the information processing device 10 and the information processing devices 20 to have the CPU 10a, the RAM 10b, and so forth, which is a basic configuration for performing data processing, and the input unit 10e and the display unit 10f do not have to be provided. Also, the input unit 10e and the display unit 10f may be externally connected using an interface.

Processing Configuration

Figure 3:
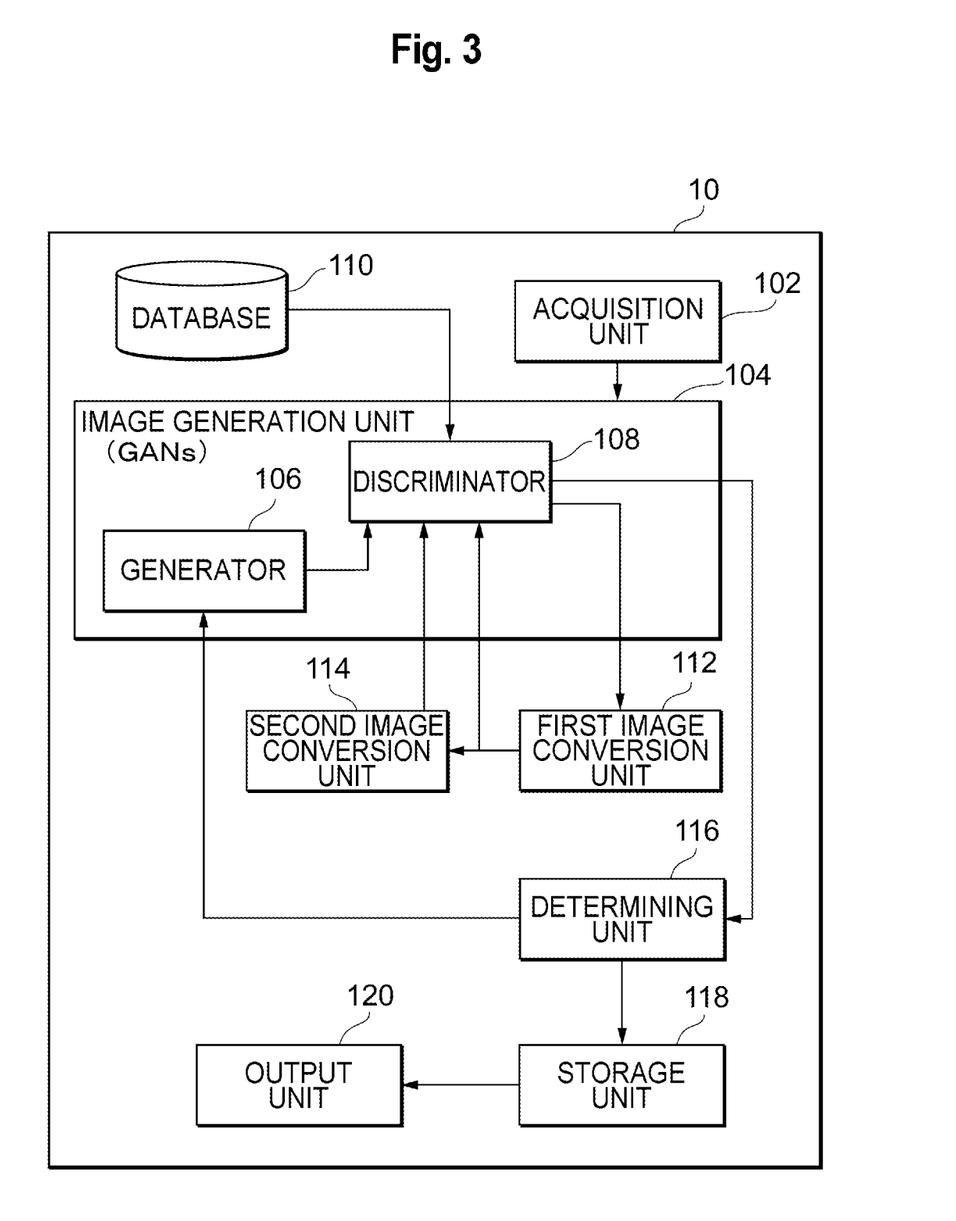
FIG. 3 is a diagram illustrating an example of processing blocks of the information processing device according to the embodiment.

FIG. 3 is a diagram illustrating an example of processing blocks of the information processing device (server device) 10 according to the embodiment. The information processing device 10 includes an acquisition unit 102, an image generation unit 104, a database 110, a first image conversion unit 112, a second image conversion unit 114, a determining unit 116, a storage unit 118, and an output unit 120. The information processing devices 20 may be made of quantum computers or the like.

The acquisition unit 102 and the output unit 120 can be realized by the communication unit 10d illustrated in FIG. 2, for example. The image generation unit 104, the first image conversion unit 112, the second image conversion unit 114, and the determining unit 116 can be realized by the CPU 10a illustrated in FIG. 2, for example. The database 110 can be realized by the ROM 10c and/or the RAM 10b illustrated in FIG. 2, for example. The storage unit 118 can be realized by the RAM 10b and/or the ROM 10c illustrated in FIG. 2, for example.

The acquisition unit 102 acquires image generation requests. Image generation requests may be requests transmitted from the information processing device 20, or may be requests acquired in accordance with operations performed by a user who manages the information processing device 10. For example, an image generation request is image data and image generation conditions, text for generating an image, or the like, and may be data input for an image to be generated by GANs. The acquisition unit 102 commands the image generation unit 104 to generate images in accordance with acquisition of image generation requests.

The image generation unit 104 generates a predetermined image by running generative adversarial networks (GANs). As a specific example, the image generation unit 104 generates a first image in raster format using generative adversarial networks (GANs) including a generator 106 and a discriminator 108. GANs can use one of the following techniques, for example.

(1) pix2pix

From a pair of a condition image and an image, learning is performed regarding a relation between the images, whereby an image, in which the image relation of the pair that is learned is compensated, is generated from a single image.

(2) CycleGAN

Two sets of images are used, and learning is performed such that precision is high when, from one image, another image is generated, and then the other image is returned to the one image (cycle).

(3) CGAN (Conditional GAN)

Called conditional GAN, in which training is carried out so as to be able to perform conditioning, by imparting additional information to the generator and the discriminator besides the image data.

(4) DCGAN (Deep Convolutional GAN)

DCGAN is a type of CGAN in a broad sense, and a major difference with original GAN is that images are generated not using the affine layer but rather the convolution layer and the transposed convolution layer for the respective networks of the generator and the discriminator.

(5) PGGAN (Progressive Growing GAN)

Unlike in DCGAN, in PGGAN the resolution of learning data is raised stepwise, and in conjunction therewith, layers are added, and the resolution is raised with the object structures of the networks of the generator and the discriminator maintained, thereby generating an image.

(6) BigGAN

Orthogonal normalization is performed with regard to the generator, and an image is generated using a model that conditionally generates a high-resolution image that is 512×512 pixels maximum.

(7) StyleGAN

Progressive growing is used in which, starting with low-resolution learning, learning is advanced while gradually adding layers corresponding to higher resolution to the model, thereby generating an image.

(8) StackGAN

A configuration of a plurality of stages of GAN is made, in which a generalized low-resolution image is generated by initial-stage GAN, and a higher-resolution image is generated in subsequent-stage GANs.

(9) AttnGAN

Attention is paid to individual words portrayed in text, like image captions, and details are synthesized in various image subregions, thereby generating an image.

The above-described techniques are examples of GANs, and techniques of other GANs may be used.

The image generation unit 104 generates an image in response to an image generation request by running predetermined GANs. For example, the image generation unit 104 generates noise and inputs the noise to the generator 106. The generator 106 generates an image using the input noise or data included in the image generation request. The noise may be a random number. A neural network having a predetermined structure of one of the GANs described above may be used for the generator 106, for example.

The discriminator 108 acquires a first image that is in raster format, which has been generated by the generator 106, and/or a correct-answer image stored in the database 110. The discriminator 108 distinguishes whether the input image is an image generated by the generator 106 or a correct-answer image. A neural network having a predetermined structure of one of the GANs described above corresponding to the generator 106 may be used for the discriminator 108, for example. Note that the correct-answer image does not necessarily have to be stored in the database 110, and may be an image that satisfies conditions specified by the image generation request.

The image generation unit 104 updates parameters of the generator 106 and the discriminator 108 in accordance with the distinguishing results of the discriminator 108 distinguishing the authenticity. For example, the image generation unit 104 updates the parameters of the discriminator 108 using error backpropagation such that the discriminator 108 will correctly distinguish the authenticity of the input image. Also, the image generation unit 104 updates the parameters of the generator 106 using error backpropagation such that the discriminator 108 will distinguish the image generated by the generator 106 as the correct-answer image. The image generation unit 104 outputs an image generated at the end to the first image conversion unit 112.

The first image conversion unit 112 acquires the image generated by the image generation unit 104 at the end (first image), and performs conversion thereof into an image in vector format (second image). The first image conversion unit 112 can use one of known techniques with regard to the conversion technique from raster format to vector format. Examples of conversion tools for conversion from raster format to vector format include Vectorizer.io, Vector Magic, Autotracer.org, Convertio, pngtosvg.com, and so forth. The first image conversion unit 112 outputs the second image in vector format to the second image conversion unit 114 or the discriminator 108.

The second image conversion unit 114 converts the second image in vector format that has been generated by the first image conversion unit 112 into an image in raster format (third image). For example, the second image conversion unit 114 may execute processing of displaying the image in vector format on a display, and perform conversion to raster format from the state in which the image is displayed. Also, if the second image is in Scalable Vector Graphics (SVG) format, the image is displayable on a display by a browser, and the image in the form displayed on the display may be converted to the third image in raster format. The second image conversion unit 114 can use one of known vector format conversion techniques. Examples of conversion tools for conversion from vector format to raster format include svgtopng.com, Adobe Photoshop Express, and so forth. The second image conversion unit 114 outputs the third image in raster format to the discriminator 108.

The discriminator 108 inputs the second image in vector format that is output by the first image conversion unit 112 or the third image in raster format that is output by the second image conversion unit 114, and acquires discrimination results.

In a case of the second image being input to the discriminator 108, the discriminator 108 may execute meta learning that is not model-dependent (Model-Agnostic Meta-Learning for Fast Adaptation of Deep Networks (https://arxiv.org/abs/1703.03400). By performing meta learning capable of classification learning even data of different data formats, the discriminator 108 can perform classification of authenticity using the same learning model for images in raster format and images in vector format.

The determining unit 116 acquires discrimination results of the second image or the third image output from the discriminator 108, and discrimination results of the first image that is the base for the second image, and determines whether or not the discrimination results of the two are the same. For example, the discrimination results of the first image are presumed to be discriminated to be the same as the correct-answer image, i.e., to be "true". Accordingly, the determining unit 116 may determine whether the discrimination results of the second image or the third image output from the discriminator 108 are true (the same as the correct-answer image). In a case in which the determination results are affirmative, the determining unit 116 instructs the storage unit 118 to store the second image in vector format.

The storage unit 118 stores the second image regarding which the affirmative determination has been made by the determining unit 116. Affirmative determination means that determination is made that the discrimination results of the second image or the third image output from the discriminator 108 are true (the same as the correct-answer image), or that determination is made that the discrimination results of the second image or the third image output from the discriminator 108 and the discrimination results of the first image are the same.

Note that at the time of performing authenticity determination, the discriminator 108 performs discrimination with the correct-answer image registered in the database 110 or a predetermined image identified by the image generation request as being true, but in a case in which the second image or the third image is input, authenticity may be discriminated with the first image as being true.

The output unit 120 may output the second image in vector format that is stored in the storage unit 118, to an information processing device 20 that transmitted the image generation request. Also, the output unit 120 may perform output to an information processing device 20 that transmitted an acquisition request for the second image.

According to the above processing, the predetermined image in raster format that is generated by AI is converted into vector format taking into consideration conversion error, and thus deterioration of image quality can be suppressed even if the predetermined images are subjected to change in size. For example, in a case in which images generated by AI are sold in virtual space (e.g., in a metaverse), images can be sold that do not exhibit image quality deterioration even when the size thereof is changed.

Now, in a case in which judgment of false is made in the authenticity determination due to conversion error in conversion from raster image to vector image, or in a case in which the discrimination results at the discriminator 108 differ between before and after conversion, an image in vector format, in which the image at the time of being displayed is taken into consideration, is preferably generated. There are two examples regarding updating of images in vector format at this time, namely, an Example 1 in which an image in vector format is updated using an image in raster format, and an Example 2 in which Example 1

In Example 1, an image in vector format is updated using an image in raster format, as described above, in which a new first image is generated (updated) using the GANs of the image generation unit 104. The block configuration illustrated in FIG. 3 corresponds to a block configuration according to Example 1.

In a case in which discrimination results of the second image or the third image are false, or in a case in which the discrimination results of the second image or the third image differ from the discrimination results when the first image is input to the discriminator, the determining unit 116 according to Example 1 inputs noise to the generator 106 and instructs the generator 106 to generate a new image.

The generator 106 generates an image using the noise, and the discriminator 108 performs discrimination regarding the authenticity of the image generated by the generator 106. The image judged to be true (updated first image) here is output to the first image conversion unit 112, and the updated first image is converted into a second image. The second image, or a third image obtained by conversion of the second image is input to the discriminator 108, and discrimination results thereof are output to the determining unit 116. The processing of image generation, discrimination of authenticity, conversion, and determination, is repeated at the determining unit 116, until the results of the discriminator 108 are determined to be true. At the end, the second image in vector format in a case of affirmative determination being made by the determining unit 116 is stored in the storage unit 118.

This enables an image in vector format, which will be determined to be true by the discriminator 108 when displayed, to be saved taking conversion error into consideration. Accordingly, image quality does not deteriorate when enlarging or reducing, and image quality of images generated by image-generating AI can be maintained.

Also, when giving instructions for image generation to the generator 106, the determining unit 116 may change the noise in accordance with a conversion algorithm for conversion from the first image in raster format to the second image in vector format. For example, the information processing device 10 may learn a relation between the conversion algorithm for conversion from raster format to vector format and the noise, using a learning model, and comprehend which noise will lead to an early convergence when applied. At this time, the determining unit 116 may hold information correlated noise with each conversion algorithm, and use this information to select and output noise corresponding to the conversion algorithm used by the first image conversion unit 112 to the generator 106.

Accordingly, the speed of convergence until an affirmative determination is made by the determining unit 116 can be increased, and processing efficiency of the information processing device 10 can be improved.

Data Example

Figure 4:
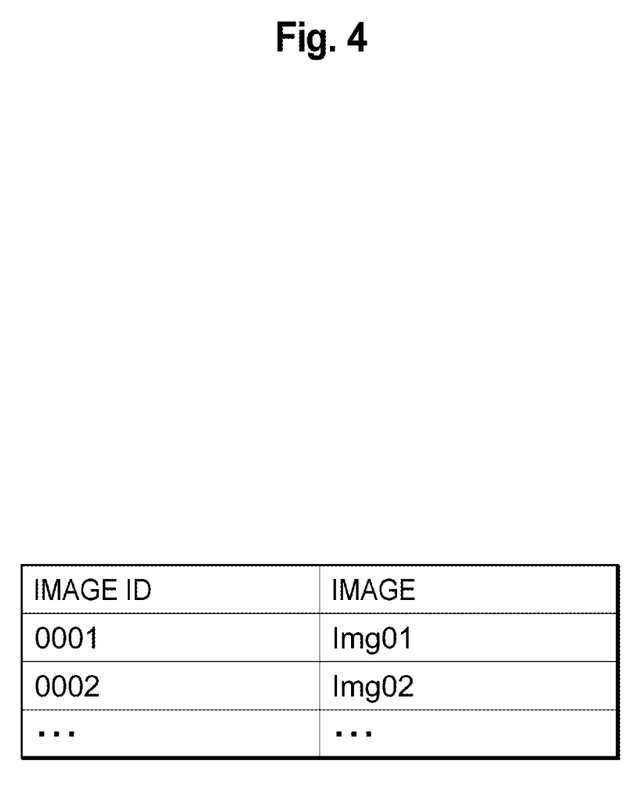
FIG. 4 is a diagram showing an example of saved images according to Example 1.

FIG. 4 is a diagram showing an example of saved images according to Example 1. The example shown in FIG. 4 shows an example of images stored in the storage unit 118. For example, an image in vector format is imparted an image ID, and data of vector format is correlated as "Img01" with an image ID "0001". Data of vector format is, for example, numerical values of a plurality of points that are control points, curves derived by mathematical formulae from these points, and so forth.

Figure 5:
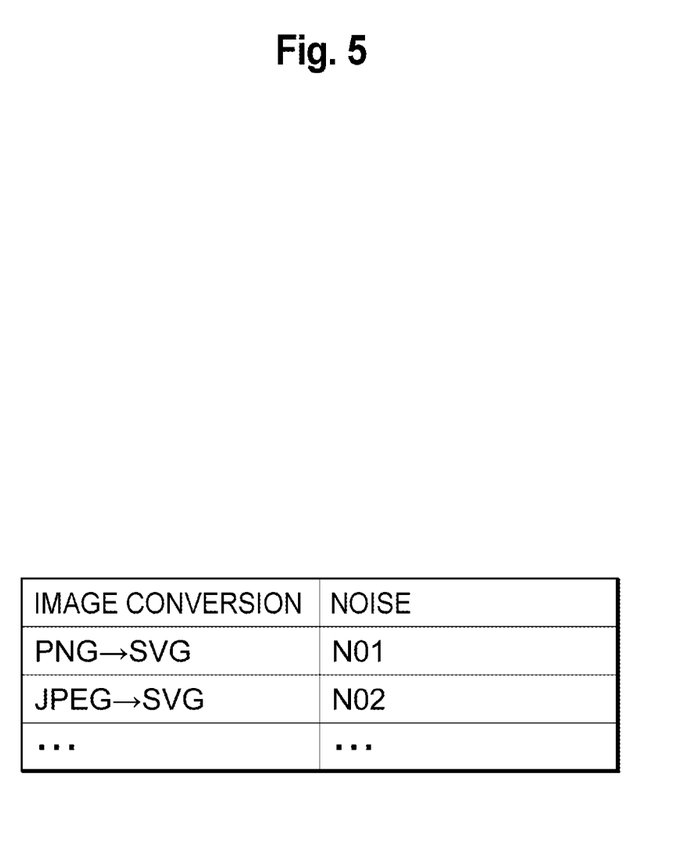
FIG. 5 is a diagram showing an example of noise correlated with image conversion algorithms according to Example 1.

FIG. 5 is a diagram showing an example of noise correlated with image conversion algorithms according to Example 1. The information shown in FIG. 5 is held by the determining unit 116, for example. In a case of a conversion algorithm that converts from "PNG" in raster format to "SVG" in vector format, for example, noise "N01" is correlated thereto. The relation between conversion algorithms and noise shown in FIG. 5 may be learned using a learning model.

Processing Example

Figure 6:
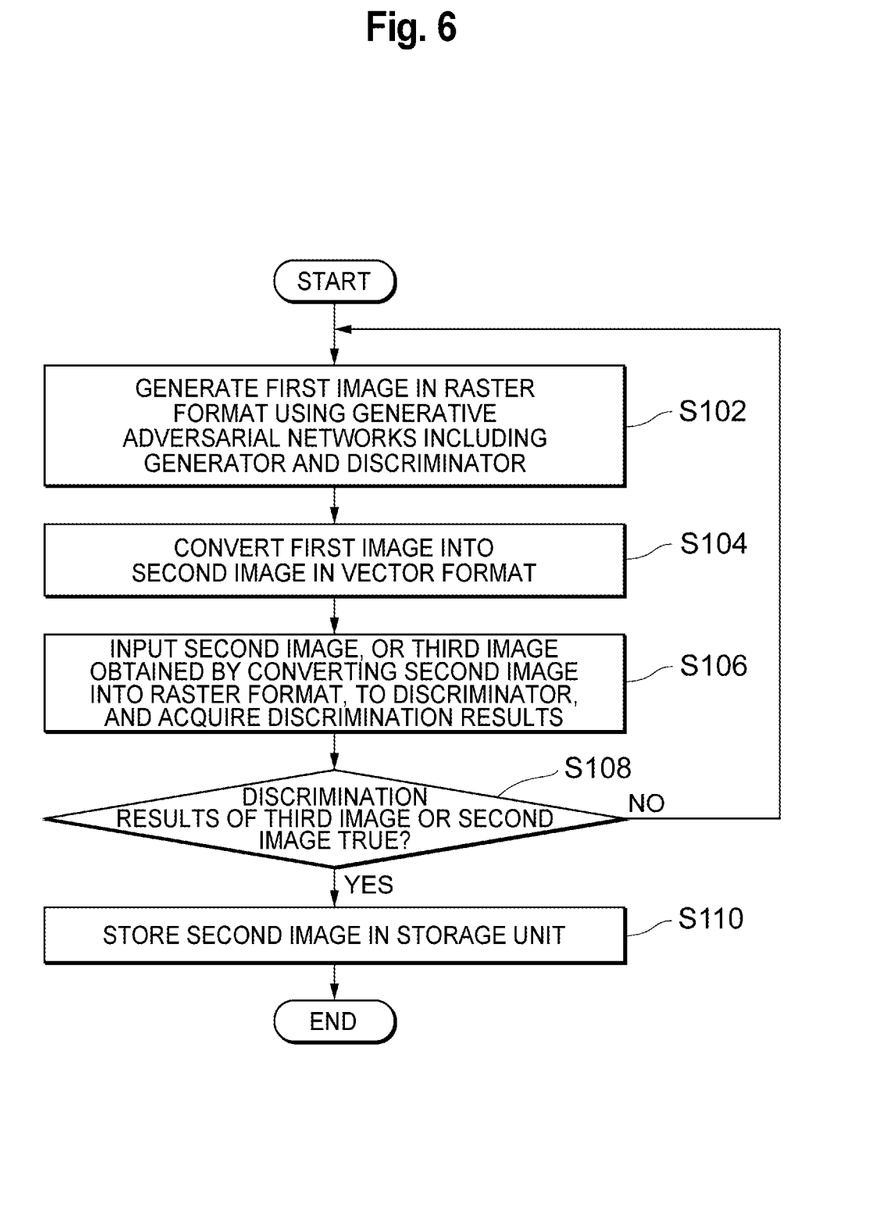
FIG. 6 is a flowchart showing a processing example of the information processing device according to Example 1.

FIG. 6 is a flowchart showing a processing example of the information processing device 10 according to Example 1. In step S102, the image generation unit 104 generates a first image in raster format, using generative adversarial networks including the generator 106 and the discriminator 108.

In step S104, the first image conversion unit 112 convers the first image generated by the image generation unit 104 into a second image in vector format. At this time, the image generation unit 104 preferably outputs the first image generated at the end (judged to be true by the discriminator 108) to the first image conversion unit 112.

In step S106, the first image conversion unit 112 inputs the converted second image to the discriminator 108, or the second image conversion unit 114 converts the second image into a third image in raster format, and inputs the third image obtained by converting to the discriminator 108. The discriminator 108 performs discrimination regarding the authenticity of the second image or the third image, and acquires discrimination results.

In step S108, the determining unit 116 determines whether the discrimination results of the second image or the third image are true, or whether these discrimination results are the same as the discrimination results by the discriminator 108 regarding the first image that is the base for the second image. If the determination results of step S108 are affirmative, the processing advances to step S110, and if the determination results of step S108 are negative, the processing returns to step S102, and the first image is updated by the image generation unit 104.

In step S110, in a case in which the results of the determining unit 116 are affirmative, the storage unit 118 stores the second image in vector format, regarding which the affirmative determination has been made.

Thus, the above processing enables, with respect to the first image judged to be true using the generative adversarial networks (GANs), updating of the image using the same GANs, taking into consideration conversion error in conversion to vector format, and thereby can be saved as an image in vector format. The second image in vector format affirmed by the determining unit 116 at the end is unchanged in quality from the image in raster format judged to be true by the discriminator 108, when this second image is displayed, and the image quality is not deteriorated when changing the size thereof.

Example 2

An image in vector format is directly updated in Example 2, as described above. For example, the image in vector format is updated using a Deep SVG (https://proceedings-.neurips.cc/paper/2020/file/bcf9d6bd14a2095866ce8c950b702341-Paper.pdf) generation model that is capable of generating images in vector format. Note that any model may be used as long as a model that generates images in vector format.

Figure 7:
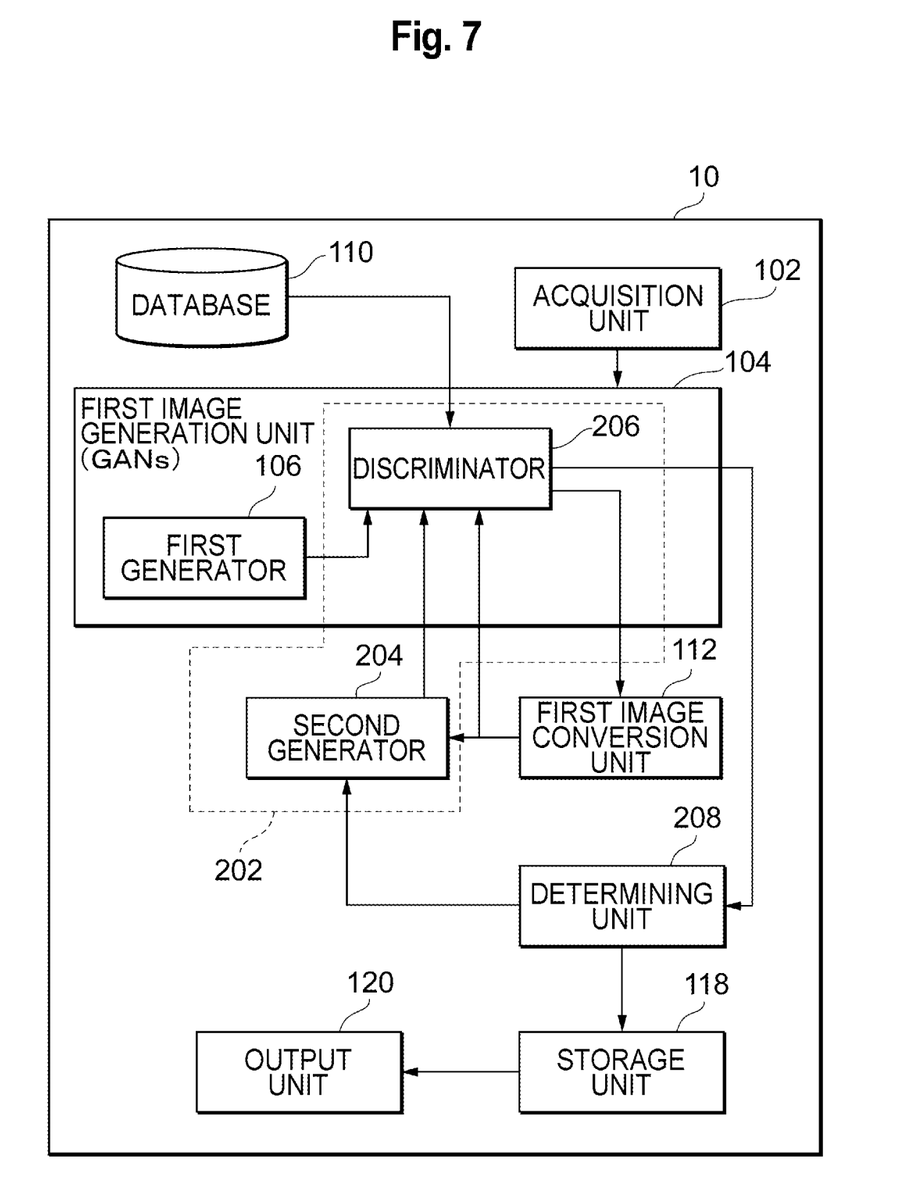
FIG. 7 is a diagram illustrating an example of processing blocks of an information processing device according to Example 2.

FIG. 7 is a diagram illustrating an example of processing blocks of the information processing device 10 according to Example 2. Blocks that perform processing equivalent to the processing blocks illustrated in FIG. 3 are denoted by the same signs. A second image generating unit 202 illustrated in FIG. 7 makes up second generative adversarial networks including a second generator 204 that generates images in vector format using a generation model capable of generating images in vector format (e.g., DeepSVG), and a discriminator 206. Note that the generative adversarial networks that generate images in raster format will be referred to as "first image generation unit 104".

In a case in which discrimination results of discrimination by the discriminator 206 regarding the second image obtained by converted by the first image conversion unit 112 are not true, a determining unit 208 instructs the second generator 204 to generate an image in vector format.

The second generator 204 inputs the vector image generated using the generation model to the discriminator 206. Now, the second image generating unit 202 generates a high-quality vector image, using the generative adversarial networks including the second generator 204 and the discriminator 206. The discriminator 206 here has a learning model for executing meta learning such as described above, in order to perform authenticity judgment using images in vector format.

The determining unit 208 acquires discrimination results of discrimination by the discriminator 206 of the second image generating unit 202, and if the discrimination results are false, instructs the second generator 204 to perform image generation. If the discrimination results are true, the determining unit 208 outputs the second image in vector format to be stored in the storage unit 118.

Thus, the above processing enables processing to be executed on an image in vector format without conversion thereof, by new generative adversarial networks being configured using the second generator 204 that generates images in vector format, and the discriminator 206 that performs discrimination of authenticity of images in vector format. Thus, processing of converting from images in vector format into images in raster format can be omitted. The processing load of the information processing device 10 can be reduced.

Processing Example

Figure 8:
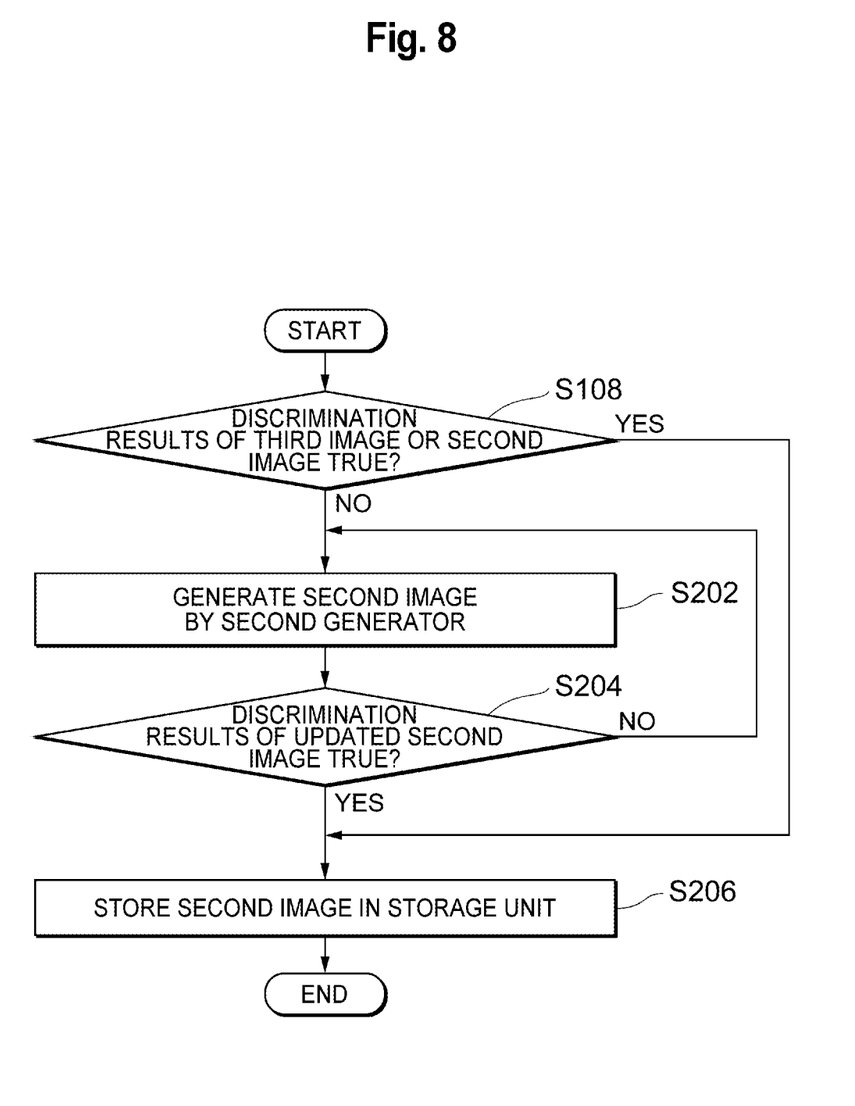
FIG. 8 is a flowchart showing a processing example of the information processing device according to Example 2.

FIG. 8 is a flowchart showing a processing example of the information processing device 10 according to Example 2. In the processing according to Example 2, the processing of steps S102 to S106 is the same as that shown in FIG. 6, and accordingly this processing is omitted from being shown in FIG. 8. FIG. 8 shows processing of step S108 and thereafter.

In step S108, the determining unit 208 determines whether the discrimination results for the second image or the third image are true, or whether these discrimination results are the same as the discrimination results by the discriminator 206 regarding the first image that is the base for the second image. If the determination results of step S108 are affirmative, the processing advances to step S206, and if the determination results of step S108 are negative, the processing advances to step S202.

In step S202, the second generator 204 generates (updates) a new second image, using a generation model that generates an image in vector format.

In step S204, the determining unit 208 determines whether the discrimination results regarding the second image that has been updated are true. If the determination results of step S204 are affirmative, the processing advances to step S206, and if the determination results of step S204 are negative, the processing returns to step S202.

In step S206, in a case in which the results of the determining unit 208 are affirmative, the storage unit 118 stores the second image in vector format, regarding which the affirmative determination has been made.

Thus, the above processing enables processing to be executed on an image in vector format without conversion thereof, by new generative adversarial networks being configured using the second generator 204 that generates images in vector format, and the discriminator 206 that performs discrimination of authenticity of images in vector format. Thus, processing of converting from images in vector format into images in raster format can be omitted. The processing load of the information processing device 10 can be reduced. In Example 2, the above-described image in vector format may be generated using the first image conversion unit 112, the second image generating unit 202, and the determining unit 208, with an image in raster format that has been generated by other than the first image generation unit 104 as a true image.

Also, as described above, the second image stored in the storage unit 118 in Example 1 and Example 2 may be used in virtual space. Images in raster format may be referred to as raster images, and images in vector format as vector images.

The embodiment described above is for facilitating understanding of the present invention and is not for construing the present invention restrictively. The components included in the embodiment, and the layouts, materials, conditions, forms, sizes, and so forth thereof are not limited to those exemplified, and alterations can be made as appropriate. Configurations illustrated in different embodiments can be partially substituted or combined with each other.

What is claimed is:

1. An information processing method executed by an information processing device having a processor, the processor executing:
   generating a first image in raster format using a generative adversarial network that includes a generator and a discriminator;
   converting the first image into a second image in vector format;
   inputting a third image obtained by converting the second image into raster format, or the second image, to the discriminator, and acquiring discrimination results; and
   storing the second image in a storage unit, if the discrimination results are true, or if the discrimination results are the same as discrimination results by the discriminator regarding the first image.

2. The information processing method according to claim 1, wherein, in a case in which the second image is input to the discriminator, the discriminator also executes model-agnostic meta learning.

3. The information processing method according to claim 1, the processor further executing:
   inputting noise to the generator, and instructing the generator to generate a new image, in a case in which the discrimination results are false, or differ from the discrimination results when the first image is input to the discriminator.

4. The information processing method according to claim 3, wherein the instructing further includes
   changing the noise in accordance with a conversion algorithm for conversion from the first image to the second image.

5. The information processing method according to claim 2, the processor further executing:
   instructing another generator that generates an image in vector format to generate a new image, in a case in which the discrimination results are false; and
   the other generator inputting the image of the vector format that is generated to the discriminator.

6. The information processing method according to claim 1, wherein the second image stored in the storage unit is used in virtual space.

7. An information processing device having a processor, the processor executing:
   generating a first image in raster format using a generative adversarial network that includes a generator and a discriminator;
   converting the first image into a second image in vector format;
   inputting a third image obtained by converting the second image into raster format, or the second image, to the discriminator, and acquiring discrimination results; and
   storing the second image in a storage unit, if the discrimination results are true, or if the discrimination results are the same as discrimination results by the discriminator regarding the first image.

8. A non-transitory computer-readable recording medium in which is recorded a program that causes a processor included in an information processing device to execute:
   generating a first image in raster format using a generative adversarial network that includes a generator and a discriminator;
   converting the first image into a second image in vector format;
   inputting a third image obtained by converting the second image into raster format, or the second image, to the discriminator, and acquiring discrimination results; and
   storing the second image in a storage unit, if the discrimination results are true, or if the discrimination results are the same as discrimination results by the discriminator regarding the first image.

* * * * *